United States Patent Office 3,497,560
Patented Feb. 24, 1970

3,497,560
METHOD OF PRODUCING ALDEHYDES IN THE VITAMIN A SERIES
Dirk Nicolaas Auke Holwerda and Pieter Henri van Leeuwen, Van Houtenlaan, Weesp, Netherlands, assignors to U.S. Philips Corporation, New York, N.Y., a corporation of Delaware
No Drawing. Filed Aug. 19, 1965, Ser. No. 481,110
Claims priority, application Netherlands, Aug. 27, 1964, 6409913
Int. Cl. C07c *45/00, 47/20 47/02*
U.S. Cl. 260—598                          7 Claims

ABSTRACT OF THE DISCLOSURE

Aldehydes of the vitamin A series for example β-ionylidene acetaldehyde are prepared by hydrogenating the corresponding nitriles in an aqueous acidic medium in the presence of a hydrogenation catalyst to form the corresponding aldimine and then hydrolysing the aldimine to the corresponding aldehyde.

This invention relates to an improved method for obtaining aldehydes of the vitamin A series.

A principal object of our invention is to provide an improved method of producing aldehydes of the vitamin A series from the corresponding nitriles.

This and other aspects of our invention will be apparent from the description that follows.

According to the novel method of invention aldehydes of the vitamin A series are produced by hydrogenating the corresponding nitrile in an aqueous, acidic medium in the presence of a hydrogenation catalyst to form the corresponding aldimine and then hydrolysing the aldimine to form the aldehyde.

By this method the aldehyde is obtained in a satisfactory yield but quite remarkably no reduction of the carbon to carbon double bonds occurs.

Nitriles of the vitamin A series are defined herein as polyene compounds containing at least one 2,2,6-trimethylcyclohexenyl-group and at least one cyane-group and also non-cyclised polyene-nitriles of this type, for example geranonitrile.

Examples of the nitriles are as follows:

FORMULAE

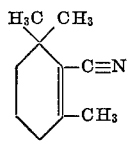

I

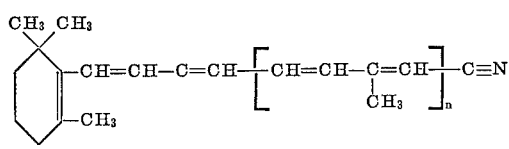

n=0 or 1

II

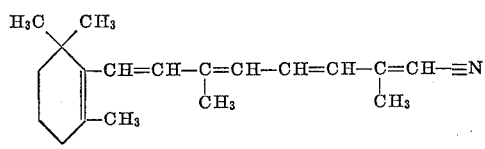

III

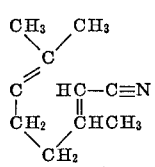

III

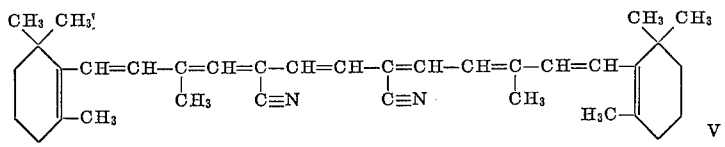

V

Particularly the aldehydes obtained by the reduction of the nitriles of Formula II are important. The two products: the ionylidene - acetaldehyde ($n=0$) and the retinal ($n=1$), are important intermediate products for the production of vitamin A by known methods.

The resultant aldehydes may be converted to compounds with vitamin A activity by known methods.

The β-ionylidene - acetaldehyde may be converted for example by condensation with acetone into the so-called $C_{18}$-ketone. By the condensation of this ketone with cyanic acetic acid and subsequent decarboxylation the nitrile of the Formula II, in which $n=1$, can be obtained. The resultant aldehyde, the retinal, a compound with vitamin A activity can be converted by reduction into vitamin A.

As a catalyst in the hydrogenation according to the invention use is preferably made of a Raney catalyst, for example Raney Ni, Co and/or Fe, particularly nickel.

The pH value of the aqueous medium is preferably held between 1 and 6. A strong inorganic acid, preferably sulphuric acid in a mixture of alcohol and water may be used as an aqueous, acidic medium.

The reaction is, however, preferably carried out in a mixture of water and a weak acid, for example an aliphatic carboxylic acid, particularly a mixture of water and acetic acid.

In order to improve the solubility of the nitrile in the reaction medium an organic solvent for example an alcohol, ethanol or methanol may be added. The hydrogenation may be performed under atmospheric pressure, a reduced pressure or an increased pressure, in accordance with the activity of the catalyst at a temperaure lying between 0° C. and 80° C., preferably between room temperature and 80° C.

The yield of the reaction may be further raised by suppressing the reduction to amine and/or alcohol by means of a catalyst poison, for example an amine such as pyridine or hexamethylenetetramine. The aldimine formed is strongly hydrolysed in the reaction medium to the aldehyde.

Our invention will now be described in greater detail with reference to the following examples.

EXAMPLE I 2 gms. of β-ionylidene-acetonitrile (Formula II, $n=0$) was dissolved in a mixture of 80 mls. of acetic acid and 20 mls. of water in a 250 mls. thick-neck flask with a stirrer. 0.5 gm. of Raney nickel was added. The liquid was heated before 55° C. and 60° C. The air was expelled by several exhaustions and by admitting nitrogen. After the last exhaustion hydrogen was conducted above the liquid. About 100 mls. of hydrogen an hour was absorbed. After two hours no more hydrogen was absorbed. The hydrogen was removed and the nickel catalyst was filtered off. The filtrate was diluted with 500 mls. of water and extracted four times with 100 mls. of petroleum-ether. The petroleum-ether extract was washed, first with a diluted, aqueous $NaHCO_3$ solution and then with water. After evaporation of the petroleum-ether 1.4 gms. of a yellow-brown oil was obtained, the β-ionylidene-acetaldehyde.

$E^{1\%}_{1 cm.} \lambda_{max.} = 327$ mμ: 735 measured in 0.01 N methanolic NaOH.

EXAMPLE II 2 gms. of vitamin A acid nitrile (Formula II, $n=1$) was dissolved in a mixture of 10 mls. of acetic acid, 30 mls. of water, 60 mls. of ethyl alcohol and 2 of hexamethylenetetramine. 5 gms. of nickel-aluminum alloy was added. The air was expelled by several steps of consecutively exhausting the air and introducing nitrogen. After the last exhausting process hydrogen was introduced. The mixture was then heated at 70° C. and stirred vigorously. After the required quantity of hydrogen had been absorbed, the catalyst was filtered off. The filtrate was diluted with 500 mls. of water and extracted four times with 100 mls. of petroleum ether. The petroleum ether extract was washed first with a diluted, aqueous sulphuric acid, then with a diluted, aqueous $NaHCO_3$ solution and subsequently with water. After evaporation of the petroleum ether 1.9 gms. of vitamin A aldehyde was obtained in the form of a yellow, crystalline substance.

$E^{1\%}_{1 cm.}$ at $\lambda_{max.} = 384$ mμ: 1514 measured in methanol (0.001 N NaOH).

While we have described our invention in connection with specific embodiments and applications, other modifications thereof will be readily apparent to those skilled in this art without departing from the spirit and scope of the invention as defined in the appended claims.

What we claim is:

1. A method of producing an aldehyde selected from the groups consisting of geranial and aldehydes of hydrocarbon compounds containing from one to two 2,2,6-trimethylcyclohexenyl groups said method comprising dissolving a nitrile of the group consisting of:

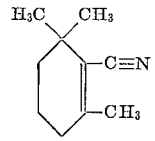

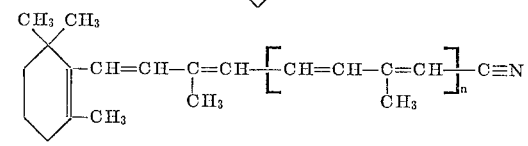

wherein $n=0$ or 1 and

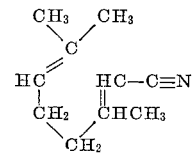

in an aqueous acidic solution of an acid selected from the group consisting of sulfuric acid and aliphatic carboxylic acids, said solution containing a Raney catalyst and having a pH between 1 and 6, introducing hydrogen into the resultant solution while maintaining the solution at a temperature between 0° C. and 80° C. and separating the corresponding resultant aldehyde from the solution.

2. The method of claim 1 wherein a nickel catalyst is employed.

3. The method of claim 2 wherein the reaction is carried out in a mixture of acetic acid and water.

4. The method of claim 1 wherein β-ionylidene acetonitrile is converted into β-ionylidene acetaldehyde.

5. The method of claim 1 wherein vitamin A acid nitrile is converted into retinal.

6. The method of claim 3 wherein β-ionylidene acetonitrile is converted into β-ionylidene acetaldehyde.

7. The method of claim 3 wherein vitamin A acid nitrile is converted into retinal.

References Cited

UNITED STATES PATENTS

| | | | |
|---|---|---|---|
| 2,904,594 | 9/1954 | Huisman et al. | 260—599 XR |
| 3,076,033 | 1/1963 | Friedman | 260—599 XR |
| 3,147,272 | 9/1964 | Brown et al. | 260—599 XR |

OTHER REFERENCES

Gaiffe et al. (I), Comptes Rendus, vol. 252 (1961) pp. 1339–1340.

Gaiffe et al. (II), Comptes Rendus, vol. 254 (1962) pp. 3099–3100.

BERNARD HELFIN, Primary Examiner

U.S. Cl. X.R.

260—601

UNITED STATES PATENT OFFICE
CERTIFICATE OF CORRECTION

Patent No. 3,497,560          Dated February 24, 1970

Inventor(s) Dirk Nicolaas Auke Holwerda et al.

It is certified that error appears in the above-identified patent and that said Letters Patent are hereby corrected as shown below:

Column 2, formula III should appear as shown below:

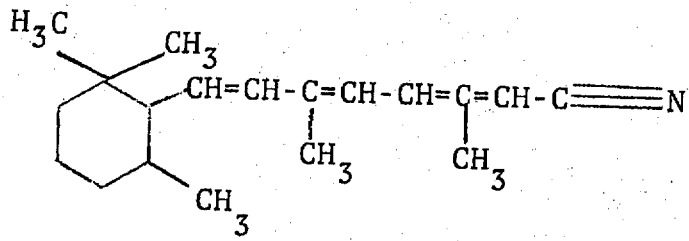

Column 2, change "III" (second occurrence) to -- IV --.

Signed and sealed this 1st day of September 1970.

(SEAL)
Attest:

EDWARD M. FLETCHER, JR.
Attesting Officer

WILLIAM E. SCHUYLER, JR.
Commissioner of Patents